(12) United States Patent
Staub et al.

(10) Patent No.: US 6,927,885 B2
(45) Date of Patent: Aug. 9, 2005

(54) LABEL WITH A DIFFRACTIVE BAR CODE AND READING ARRANGEMENT FOR SUCH LABELS

(75) Inventors: René Staub, Hagendorn (CH); Andreas Schilling, Hagendorn (CH); Wayne Robert Tompkin, Baden (CH); Peter Gehr, Baar (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 10/489,383

(22) PCT Filed: Sep. 6, 2002

(86) PCT No.: PCT/EP02/09985

§ 371 (c)(1),
(2), (4) Date: Mar. 11, 2004

(87) PCT Pub. No.: WO03/027952

PCT Pub. Date: Apr. 3, 2003

(65) Prior Publication Data

US 2004/0240006 A1 Dec. 2, 2004

(30) Foreign Application Priority Data

Sep. 21, 2001 (DE) .......................................... 101 46 508

(51) Int. Cl.⁷ ................................................. G03H 1/00
(52) U.S. Cl. .............................. 359/2; 359/567; 283/86; 430/10
(58) Field of Search ........................... 359/2, 567, 569; 283/86; 430/10

(56) References Cited

U.S. PATENT DOCUMENTS

| | | | |
|---|---|---|---|
| 4,856,857 A | | 8/1989 | Takeuchi et al. |
| 5,032,003 A | | 7/1991 | Antes |
| 5,059,776 A | * | 10/1991 | Antes ..................... 235/462.01 |
| 5,347,111 A | * | 9/1994 | Hoshino ..................... 235/457 |
| 5,900,954 A | * | 5/1999 | Katz et al. ..................... 359/2 |

FOREIGN PATENT DOCUMENTS

| | | | |
|---|---|---|---|
| CH | 653 782 A5 | | 1/1986 |
| DE | DT 1 957 475 | | 6/1970 |
| DE | 37 07 984 A1 | | 9/1988 |
| DE | 690 30 924 T2 | | 9/1997 |
| DE | 200 15 840 U1 | | 3/2001 |
| EP | 0 105 099 A1 | | 4/1984 |
| EP | 0 366 858 A1 | | 5/1990 |
| EP | 0 375 833 A1 | | 7/1990 |
| EP | 0 590 826 A2 | | 4/1994 |
| WO | WO 98/10324 | * | 3/1998 |
| WO | WO 98/37514 | | 8/1998 |
| WO | WO 01/80175 A1 | | 10/2001 |

* cited by examiner

Primary Examiner—Leonidas Boutsikaris
(74) Attorney, Agent, or Firm—Hoffmann & Baron, LLP (57) ABSTRACT

A label (1) made from a layer composite (15) includes at least one machine-readable diffractive bar code (3) consisting of narrow rectangular fields (4) occupied by the optically active structures and intermediate surfaces (5). The optically active structures which are covered by a reflection layer are embedded between layers of the layer composite (15). The diffractive relief structure used in the diffractive bar code (3) for the fields (4) diffracts and polarizes incident light and scatters the diffracted light into a half-space above the diffractive relief structure. A second diffractive relief structure differs at least in respect of the polarization of the polarizedly backscattered light with respect to the first diffractive relief structure. The second diffractive relief structure can be used for example for field surfaces of a second bar code in the bar code field (9) on the label (1) or for the intermediate surfaces (5). The light which is polarizedly backscattered at the diffractive bar code (3) can be detected by means of one of the known commercially available reading apparatuses for bar codes produced by printing. The bar code produced by printing can be used for individualizing the labels (1).

18 Claims, 3 Drawing Sheets

LABEL WITH A DIFFRACTIVE BAR CODE AND READING ARRANGEMENT FOR SUCH LABELS

This application claims priority based on an International Application filed under the Patent Cooperation Treaty, PCT/EP02/09985, filed on Sep. 6, 2002, and German Patent Application No. 101 46 508.4, filed on Sep. 21, 2001, both of which are incorporated herein by reference in their entirety.

BACKGROUND OF THE INVENTION

The invention relates to a label with a diffractive bar code as set forth in the classifying portion of claim 1 and a reading arrangement for recognizing information on such labels as set forth in the classifying portion of claim 13.

Such labels are used for identifying articles, identity cards or passes or stock bonds and bear numerical information relating to the article, the identity card or the bond. The bar code of such labels is read off by optical means and is distinguished by good machine readability of the information contained in the bar code.

Various kinds of bar code are known, such as for example in accordance with MIL-STD-1189 or in accordance with the "European Article Numbering Code", in which an item of information is contained in the arrangement of bar elements and intermediate spaces, of various widths. The bar elements are applied in a color contrasting with the intermediate spaces, to a carrier, usually paper, by means of a simple printing process. Reading apparatuses which can read off such bar codes are commercially available.

In accordance with U.S. Pat. No. 5,900,954 the level of safeguard of the bar code against forgery can be increased by the bar code being printed onto a carrier with a hologram. The bar code extends entirely or at least partially over the hologram.

EP 0 366 858 A1 describes various configurations of diffractive bar codes which, instead of printed bar elements, have surface elements with diffraction gratings. In comparison with the bar codes produced by a printing process the diffractive bar codes have a high level of safeguard against forgery. It will be noted however that the advantage of the high anti-forgery safeguard is achieved at the expense of a tolerance, which is low in comparison with the bar codes produced by a printing process, in regard to orientation of the diffractive bar code with respect to the reading beam of the reading arrangement, and a limitation in terms of the distance between the reading apparatus and the label, to a few centimeters. In addition the bar code which is produced individually by a printing process, with individual information, is extremely inexpensive while the diffractive bar codes can rationally be produced at viable costs, only in large quantities with identical information.

Surfaces arranged in a mosaic-like configuration, with microscopically fine diffraction structures which are embossed into plastic material, are known for example from EP-0 105 099 B1 and EP 375 833 B1. Design configurations of security labels with structures having an optical diffraction effect and the materials which can be used for that purpose are summarized in U.S. Pat. No. 4,856,857.

DE-OS No 1 957 475 and CH 653 782 disclose a further family of microscopically fine relief structures having an optical diffraction effect, under the name kinoform. It is only when the kinoform is illuminated with substantially coherent light that the light is deflected by the kinoform asymmetrically into a single spatial angle which is predetermined by the relief structure of the kinoform.

SUMMARY OF THE INVENTION

The object of the present invention is to provide an inexpensive, optically machine-readable label having at least one diffractive bar code which can be read from a distance of several decimeters with commercially available reading apparatuses.

According to the invention that object is attained by the features recited in the characterizing portion of claim 1. Advantageous configurations of the invention are set forth in the appendant claims.

BRIEF DESCRIPTION OF THE DRAWINGS

Embodiments of the invention are described in greater detail hereinafter and illustrated in the drawing in which.

DESCRIPTION OF THE PREFERRED EMBODIMENTS

Figure 1:
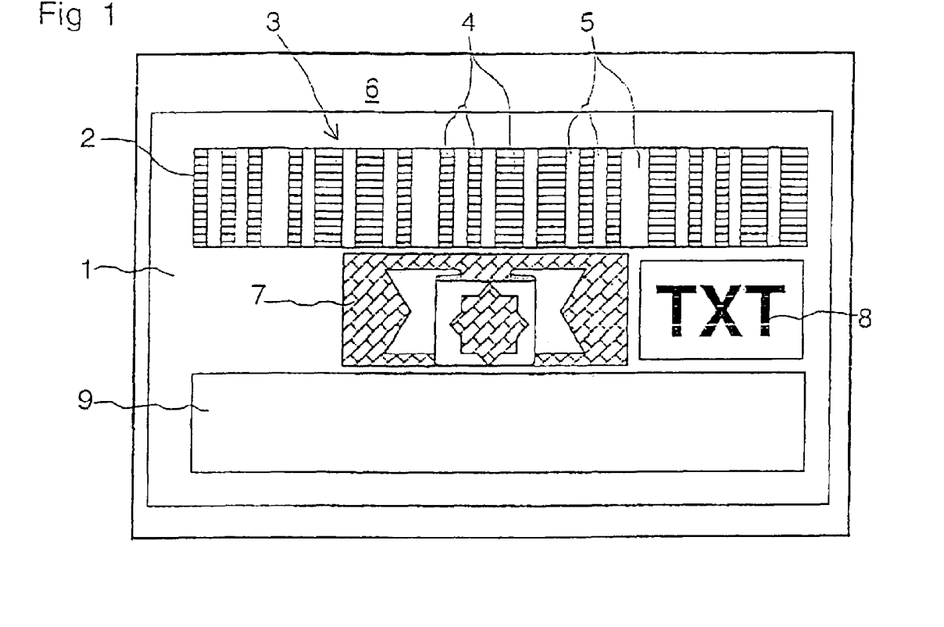
FIG. 1 shows a label with a diffractive bar code.

In FIG. 1 reference 1 denotes a label, reference 2 denotes an area with a diffractive bar code 3, 4 denotes fields and 5 denotes intermediate surfaces of the bar code 3. The fields 4 and the intermediate surfaces 5 are rectangular bars which are arranged with their longitudinal sides touching, transversely in the area 2. Each two successive fields 4 are separated by an intermediate surface 5, wherein information is coded in the succession of the fields 4 and the intermediate surfaces 5 of different widths. At least the fields 4 have diffraction structure which is embedded in the label 1. The intermediate surfaces 5 are for example in the form of reflecting or absorbing bars. In another embodiment the intermediate surfaces 5 also have diffraction structures, the azimuth of which differs from the azimuth of the diffraction structure in the fields 4 at least by ±20° modulo 180°. All fields 4 and all intermediate surfaces 5 respectively are advantageously occupied by the same optically effective structure. The label 1 is fixed for example to an article 6 and in the bar code 3 contains information about the article 6. The article 6 can be a document, a sheet of paper, a sticker or a three-dimensional body and so forth. According to the purpose of use, disposed on the remaining surface area of the label 1 are emblems 7, digits or letters 8 which serve for visual recognition of the origin of the label 1. Those items of information can be applied by a printing process or however in the form of a diffractive surface pattern which is known from above-mentioned EP 0 105 099 B1 and EP 0 375 833 B1, the diffraction structures of which are also embedded in the label 1. In another embodiment of the label 1 there is also space for an additional bar code field 9 in which a further bar code produced by a printing process or a further diffractive bar code is arranged. The bar code field 9 is advantageously oriented in parallel relationship with the area 2 so that the same reading apparatus can machine-read the further bar code from the bar code field 9 and the diffractive bar code 3 from the area 2.

Figure 2:
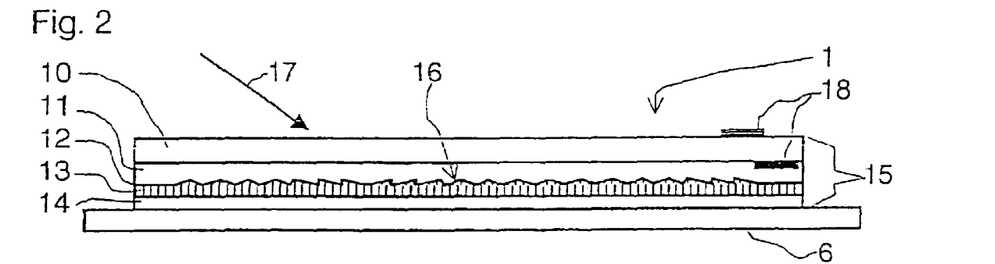
FIG. 2 shows a cross-section through the label.

FIG. 2 shows a view of the label 1 in cross-section. The label 1 is a layer composite 15 which comprises a plurality of layers 10 through 14 and which is delimited on the one side by a cover layer 10 and on the other side by an adhesive layer 14. Disposed under the cover layer 10 in succession in the specified sequence are an embossing layer 11, a reflection layer 12, a protective layer 13 and the adhesive layer 14. At least the cover layer 10 and the embossing layer 11 are transparent for at least one wavelength of light 17 incident on the label 1. Microscopically fine relief structures 16 are formed in the embossing layer 11 and diffract the, for example visible, incident light 17. The reflection layer 12 which is less than 100 nm in thickness covers the microscopically fine relief structures 16 in such a way as to be true to the shape thereof. The protective layer 13 fills the recesses of the relief structures 16 and covers the structured reflection layer 12. The adhesive layer 14 permits a secure join between the article 6 and the layer composite 15.

Various design configurations of the layer composite 15 and various forms of the materials suitable for the production thereof are summarized in Tables 1 through 6 of above-mentioned U.S. Pat. No. 4,856,857. Indicia 18 applied by a printing process are disposed at least on one of the layers 10 through 14 of the layer composite 15, with a light-absorbing ink. In one embodiment the layers 1 are individualized, or numbered in the sequence of manufacture thereof, by a further bar code in the bar code field 9 (FIG. 1), the further bar code being produced by a printing process on the cover layer 10 in the form of indicia 18.

Figure 3:
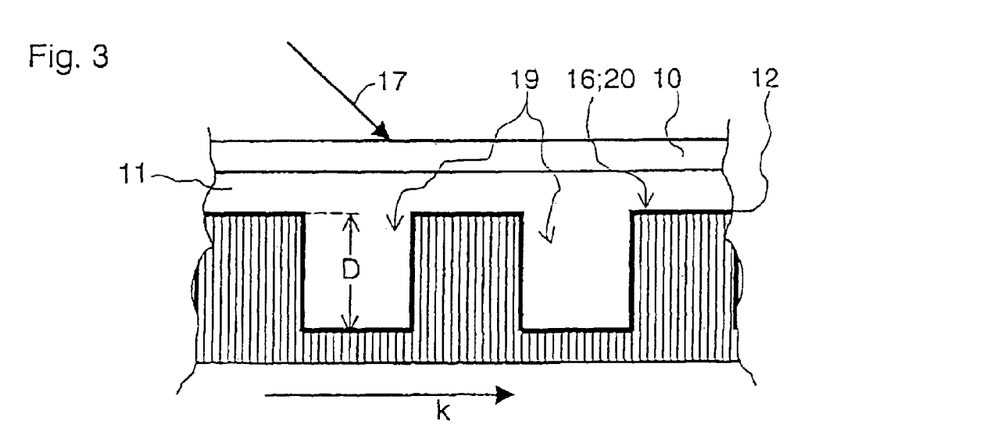
FIG. 3 shows a portion from FIG. 2 on an enlarged scale.

FIG. 3 shows by way of example a rectangular profile of a flat diffraction grating in cross-section transversely with respect to the grooves 19 of the rectangular profile. The grating vector k is therefore in the plane of the drawing. The rectangular profile has a geometrical profile depth indicated at D. As the light 17 is incident through the cover layer 10 and the embossing layer 11 onto the diffraction grating formed by the reflection layer 12, the grooves 19 are filled with the material of the embossing layer 11. Instead of the geometrical profile depth D, the optical profile depth d=D•n is operative here, wherein n is the refractive index of the material of the embossing layer 11. The rectangular profile is shown only for the sake of simplicity instead of the diffractive relief structure 16 (diffraction structure) which is described hereinafter.

If the diffraction structure has more than 2,300 lines per millimeter the light 17 which is incident in perpendicular relationship and in an unpolarized condition, from the visible range of the spectrum, is diffracted only into the zero order. For the light 17 which is incident obliquely onto the diffraction structure the line density is to be correspondingly increased, for example to a value of 2,800 lines per millimeter to 3,000 lines per millimeter. As in the case of a flat mirror the angle between the incident light 17 and the normal onto the plane of the diffraction structure is equal to the angle between the diffracted light and the normal. Such diffraction structures are referred to hereinafter as zero-order diffraction structures. Upon illumination with white daylight, unlike the flat mirror, the light diffracted at the zero-order diffraction structure has gaps in the visible part of the spectrum so that the zero-order diffraction structure acts like a mirror which reflects in color.

Figure 4:
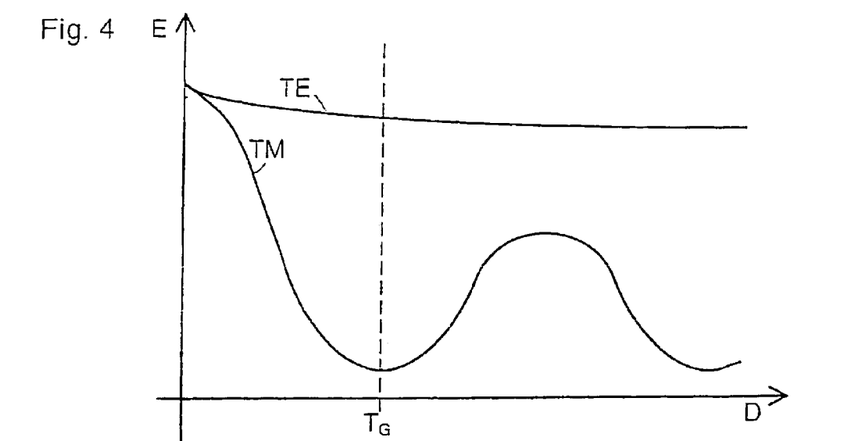
FIG. 4 shows a graph.

FIG. 4 shows a graph for the diffraction efficiency E of the flat diffraction structure for TE and TM polarized light, in dependence on the optical profile depth d=D, wherein the refractive index n=1. The TE polarized light is diffracted with a high degree of efficiency E practically independently of the profile depth D. In contrast thereto the diffraction efficiency E for the TM polarized light is strongly dependent on the profile depth D, wherein the diffraction efficiency E for the TM polarized light drops rapidly with increasing profile depth D to a first minimum. When the direction of the light 17 which is incident in an unpolarized condition and the grating vector k (FIG. 3) of the diffraction structure are in one plane the electrical field vector of the p-polarized light oscillates in parallel relationship with that plane while the electrical field vector of the s-polarized light oscillates perpendicularly thereto. The diffraction structure used for the bar code 3 is advantageously of a profile depth $T_G$ in the proximity of the first minimum as it is at that location that polarization of the diffracted light is at its greatest. The diffracted light is therefore linearly polarized, that is to say the diffractive relief structure 16 acts as a polarizer or for the light 17 incident in a polarized condition (FIG. 3) as an analyzer. A useable range of the geometrical profile depth D includes values $T_G$ of between 50 nm and 350 nm. As shown in Table 6 in above-mentioned U.S. Pat. No. 4,856,857 materials suitable for the embossing layer 11 have a refractive index n in the range of between 1.4 and 1.6.

If the diffraction structure is turned in its plane through 90°, in which case now the grooves 19 are parallel and the grating vector k perpendicular to the plane of the drawing in FIG. 3, the light which is s-polarized in relation to the plane of the incident light 17 (FIG. 3) is absorbed and the p-polarized light diffracted as indicated by the efficiency curve TE. The direction of the grating vector k (FIG. 3) can be established on the basis of the polarization capability of that diffraction structure.

Figure 5:
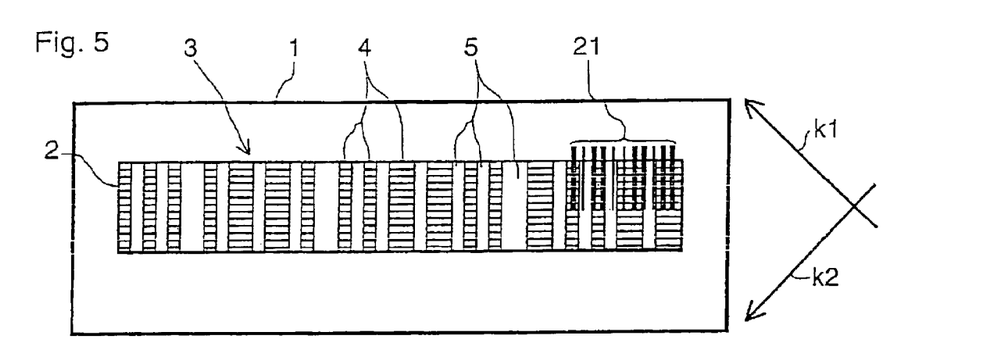
FIG. 5 shows the diffractive bar code.

The label 1 shown in FIG. 5 is cut out of the layer composite 15 (FIG. 2). The microscopically fine optically active structures, that is to say diffraction structures, mirrors and so forth, which are embedded between the layers 11 and 13 (FIG. 2) of the layer composite 15 and which are covered with the reflection layer 12 (FIG. 2), define the narrow rectangular fields 4 and the intermediate surfaces 5 of the machine-readable diffractive bar code 3 in the area 2. A first diffractive relief structure 16 (FIG. 3) is formed in the embossing layer 11 in the fields 4. The first diffractive relief structure 16 is an additive superimposition consisting of the first zero-order diffraction structure with the first grating vector k1 and a microscopically fine, light-scattering relief structure. The microscopically fine, light-scattering relief structure is a structure from the group of isotropically or anisotropically scattering matt structures, kinoforms or Fourier holograms. The diffractive relief structure 16 produced in that way affords the advantage that, in contrast to the flat diffraction structure, the diffracted light is reflected back into the entire half-space over the diffractive relief structure 16, independently of the angle of the light 17 incident on the diffractive relief structure 16 (FIG. 3). The light-scattering relief structure is advantageously so selected that the diffracted light is preferably backscattered in a direction towards the reading apparatus. That is a prerequisite for being able to use commercially available reading apparatuses for bar codes produced by a printing process, for reading the practically forgery-proof bar code 3. If the microscopically fine, light-scattering relief structure is a kinoform, the light source of the reading apparatus must produce coherent light as otherwise the desired scatter effect fails to occur.

In another embodiment of the bar code 3 the intermediate surfaces 5 are occupied by at least one further diffractive diffraction structure with the further grating vector k2 whose azimuth differs from the azimuth of the first grating vector k1 by at least ±20° modulo 180°. In another embodiment the intermediate surfaces 5 have a reflective surface structure, for example a flat mirror surface or a zero-order diffraction structure.

In a further embodiment all intermediate surfaces 5 are occupied by a second diffractive relief structure 20 (FIG. 3). The second diffractive relief structure 20 is a superimposition consisting of a second zero-order diffraction structure with the second grating vector k2 and one of the above-mentioned, microscopically fine, light-scattering relief structures. The grating vectors k1 and k2 enclose an azimuth angle in the range of between 45° and 135°, wherein the two grating vectors k1 and k2 are preferably oriented perpendicularly to each other, as illustrated in the drawing in FIG. 5.

In a preferred embodiment the first zero-order diffraction structure and the second zero-order diffraction structure involve the same parameters, except for the direction of the grating vectors k1 and k2. If the first relief structure 16 and the second relief structure 20 differ only in regard to the direction of the grating vectors k1 and k2 of the two zero-order diffraction structures, the bar code 3 cannot be recognized without auxiliary means as, for an observer, both the fields 4 and also the intermediate surfaces 5 appear as being equally bright and of the same color. Auxiliary means are here illumination of the bar code 3 with polarized light or viewing the bar code 3 through an optical polarization filter. When the bar code 3 is viewed through the optical polarization filter the observer sees for example the fields 4 in the form of light bars which are separated by intermediate surfaces 5 which appear as dark bars. After rotation of the polarization filter in its plane through 90° the fields 4 are the dark bars and the intermediate surfaces 5 are the light bars.

That embodiment of the bar code 3 has a further advantage: The bar code 3 is still readable if a further bar code produced by a printing process is arranged in the area 2 as indicia 18 (FIG. 2) over the diffractive bar code 3. The indicia 18 are bars 21 of the further bar code, which are separated by color-free intermediate spaces, and are printed on or under the cover layer 10 of the layer composite 15 (FIG. 2), with a light-absorbing ink. The further bar code produced by a printing process can also be recognized with the commercially available reading apparatus. The bars 21 and the color-free intermediate spaces disposed therebetween are oriented in parallel relationship with the fields 4 and intermediate surfaces 5 of the diffractive bar code 3. Only one pair of the bars 21 is shown in the drawing of FIG. 5 for illustrative reasons. Recognizability of the narrow bars of the diffractive bar code 3 is a condition for a successful reading operation. The bars 21 of the further bar code may cover the narrow bars of the diffractive bar code 3 at most in a range of between 50% and 70%, that is to say the surfaces of each field 4 and of each intermediate surface 5 are at least 30% visible through the color-free intermediate spaces. Each label 1 can be inexpensively individualized with the further bar code, for example but serial numbering thereof.

Figure 6:
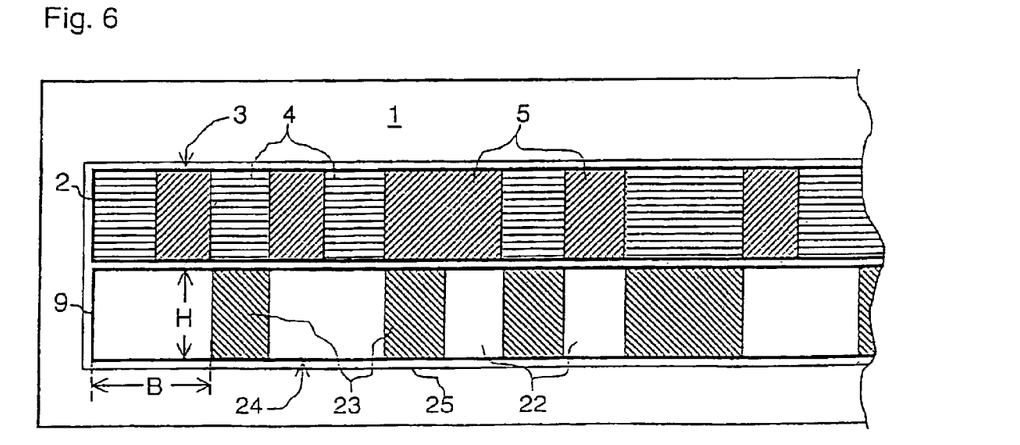
FIG. 6 shows two parallel bar codes.

FIG. 6 shows the area 2 with the first diffractive bar code 3 and the bar code field 9 which is parallel to the area 2, with a second diffractive bar code 24 formed from field surfaces 22 and intermediate fields 23. If in an embodiment of the label 1 the area 2 and the bar code field 9 meet with their longitudinal sides the area 2 and the bar code field 9 form a field portion 25 of the label 1. The two diffractive bar codes 3, 24 are arranged in mutually juxtaposed relationship and parallel in the field portion 25. So that the two bar codes 3, 24 are recognized separately in the machine reading procedure, the fields 4 of the first bar code 3 differ from the field surfaces 22 of the second bar code 24 at least by virtue of their polarization capacity. The fields 4 have the above-described first diffractive relief structure 16 (FIG. 3). The field surfaces 22 of the second bar code 24 are occupied by the above-described second diffractive relief structure 20 (FIG. 3). The first and second grating vectors k1 (FIG. 5); k2 (FIG. 5) are advantageously oriented in mutually perpendicular relationship. The intermediate surfaces 5 and the intermediate fields 23 have at least one further diffractive relief structure with a further grating vector k whose azimuth differs from the azimuths of the first and second grating vectors k1; k2 by at least ±20°, or one of the above-mentioned reflective surface structures. In the incident light 17 (FIG. 3) with the one polarization effect, as viewed from the direction of the light source, the fields 4 appear light and the intermediate surfaces 5 and the second diffractive bar code 24 dark. In the incident light 17 with the other polarization effect, the field surfaces 22 are light and the intermediate fields 23 and the first diffractive bar code 3 dark.

The above-discussed diffractive bar codes 3, 24 are of a height H in the range of between 0.8 cm and 2 cm. The width B of the narrow bars is at least 90 μm.

Figure 7A:
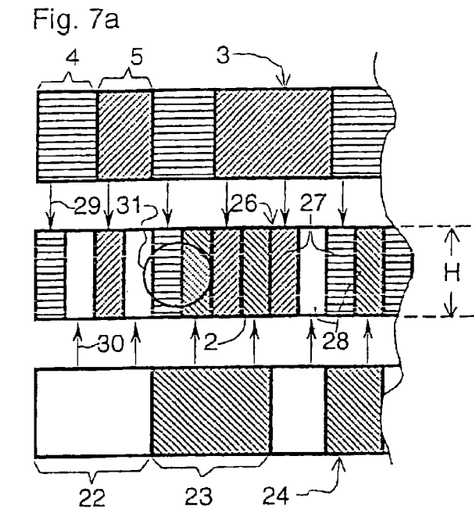
FIGS. 7a and 7b show nested bar codes.
Figure 7B:
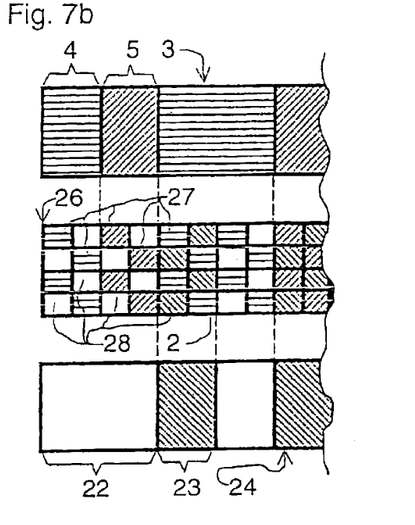

In another embodiment the two bar codes 3, 24 are not arranged in mutually parallel juxtaposed relationship but, as shown in FIGS. 7a and 7b, they are arranged in the area 2 in such a way that the two bar codes 3 and 24 determine the optically effective structures of first and second surface portions 27, 28 of a nested bar code 26, wherein each two adjacent first surface portions 27 associated with the first bar code 3 are separated by one of the second surface portions 28 associated with the second bar code 24. The surface portions 27, 28 of the nested bar code 26 are of half the area of the bars of the bar codes 3 and 24 respectively, which are formed from the fields 4 and the intermediate surfaces 5 and from the field surfaces 22 and the intermediate fields 23 respectively. The nesting effect can be very finely subdivided, in which respect the bars, irrespective of their width B (FIG. 6), are broken down in an integral number of surface portions 27 and 28 respectively as the surface portions must only involve a minimum width of 15 μm.

In the drawing of FIG. 7a for example the narrow bars of the bar codes 3 and 24 respectively are associated with a surface portion 27 and 28 and the wide bars are associated with two surface portions 27 and 28 respectively. The equal-sized first surface portions 27 and second surface portions 28 are so arranged with their longitudinal sides alternately in the area 2 that a respective one of the first surface portions 27 is followed by one of the second surface portions 28. The optically effective structures in the first surface portions 27 and in the second surface portions 28 are arranged in the sequence predetermined by the bar code 3 and the bar code 24. In the drawing in FIG. 7 the arrows 29, 30 show how the nested bar code 26 is composed of the two bar codes 3 and 24. For the sake of clarity the surface portions 27, 28 are hatched to correspond to the association with the bars 4, 5, 22, 23. The first surface portions 27 of the fields 4 are longitudinally striped with respect to the longitudinal extent of the area 2. The first surface portions 27 of the intermediate surfaces 5 involve hatching which is inclined towards the right. The second surface portions 28 associated with the field surfaces 22 are without hatching while hatching inclined towards the left marks the second surface portions 28 of the intermediate fields 23.

The narrow bars of a width of between about 90 μm and 120 μm are subdivided a maximum of eight times by the surface portions 27, 28 which are at least 25 μm wide. The commercially available reading apparatus illuminates the bar code with a light beam optically scanning the area 2 lengthwise, in an illuminated spot 31 of a diameter of about 0.1 mm. The illuminated spot 31 extends over the surface portions 28 and 27 respectively which belong to one of the narrow bars.

The above-described nesting of the two bar codes 3, 24 is only one of a large number of possible options. Another embodiment of the nested bar code 26 as shown in FIG. 7b has a chessboard-like arrangement of pixel-like equal-sized surface portions 27, 28 of a side length of between about 15 μm and 25 μm, wherein the first surface portions 27 of the first diffractive bar code 3 occupy the place of the black squares in the chessboard and the second surface portions 28 of the second diffractive bar code 24 occupy the place of the white squares. Associated with the surface portions 27, 28 are the optically active structures in the succession of the bars of the two bar codes 3, 24.

The height H (FIG. 7a) of the bars of the bar codes 3, 24, 26 is of a value in the range of between 0.8 cm and 2 cm. That height H at the limits permits reading of the bar codes 3, 24, 26 discussed herein, in a direction which is oblique in relation to the longitudinal edge of the area 2, 9 (FIG. 6), 25 (FIG. 6). Hereinafter the area 2, 9, 25 is also representative in respect of the bar code field 9 and the field portion 25.

Figure 8:
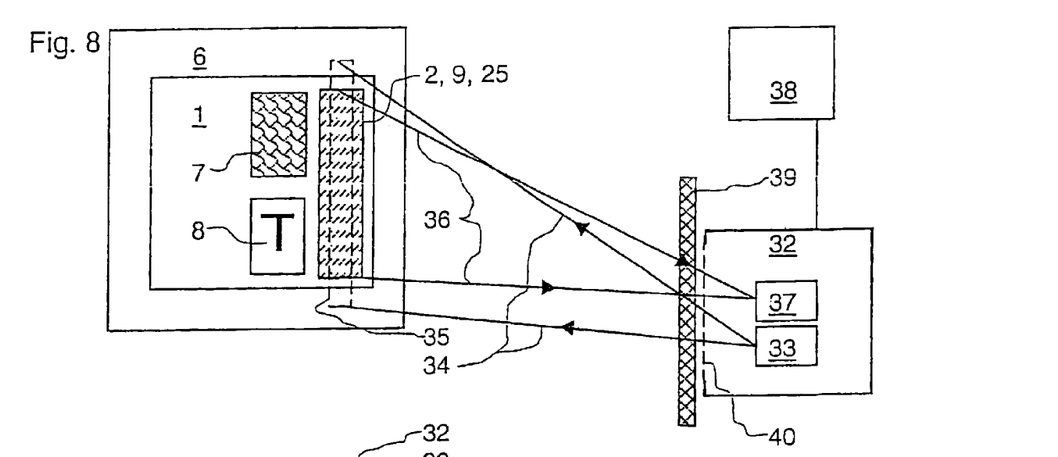
FIG. 8 shows a first reading arrangement.

FIG. 8 diagrammatically shows a reading arrangement having a reading apparatus 32 for the bar codes 3, 24, 26. A light source 33 produces a reading beam 34 with polarized or unpolarized light, which is repeatedly reciprocated over a reading region 35 by the reading apparatus 32 with a deflection device (not shown here). As soon as the area 2, 9, 25 of the label 1 on the article 6 comes into the reading region 35, light 36 which is backscattered in the illuminated spot 31 (FIG. 7) is modulated in intensity in accordance with the bar code 3, 24, 26. The backscattered light 36 is incident in the reading arrangement 32 on at least one photodetector 37. The backscattered light 36 is converted by the photodetector 37 into electrical signals which are proportional to the intensity of the backscattered light 36 and which are analyzed by the reading apparatus 32. If the reading apparatus 32 recognizes the light modulation as that of a bar code known to it, a code number corresponding to the information of the bar code 3, 24, 26 is delivered to a device 38 which provides for further processing of the code number.

If the diffractive bar code has only the one, above-described diffractive relief structure 16 acting as a polarizer (FIG. 3), the backscattered light 36 of the diffractive bar code is readable with the above-discussed reading apparatus 32 if a first optical polarization filter 39 is arranged at least in front of the photodetector 37 and is so oriented that the polarized backscattered light 36 passes the first polarization filter 39 in an unattenuated condition. When using polarized light for the reading beam 34 the light must be polarized in such a way that diffraction occurs at the first relief structure 16 at maximum efficiency. That is the case for example if the reading beam 34 and the backscattered light 35 pass through the same polarization filter 39 arranged in front of a window 40 of the reading apparatus 32, and the first diffractive relief structure 16 is oriented as an analyzer in respect of azimuth onto the polarization plane of the polarization filter 39.

Figure 9:
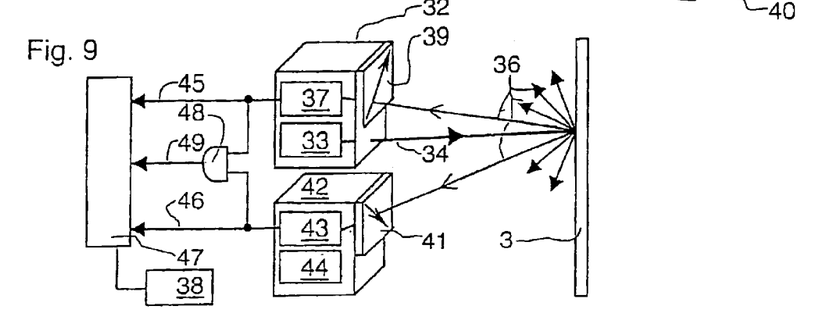
FIG. 9 shows a second reading arrangement.

If surfaces with two diffractive relief structures 16 and 20 acting as polarizers (FIG. 3) are arranged on the label 1 and the diffractive relief structures 16 and 20 differ at least in respect of the polarization capacity, then a reading arrangement as shown in FIG. 9 is capable of separately reading off the items of information contained in the first and second diffractive relief structures 16 (FIG. 3) and 20 (FIG. 3). If an unpolarized reading beam 34 is used, a second photodetector 43 is sufficient, which at the same time receives the light 36 backscattered at the second relief structure 20 acting as a polarizer, wherein a second optical polarization filter 41 is arranged in front of the second photodetector 43 oriented in such a way that only the light 36 backscattered at the second relief structure 20 penetrates to the second photodetector 43.

In a simple embodiment the reading arrangement includes two commercially available reading apparatuses 32, 42 which are so oriented that the backscattered light 36 is incident both in the first photodetector 37 in the first reading apparatus 32 and also in a second photodetector 43 of the second reading apparatus 42. The unpolarized light of the reading beam 34, which is emitted by the light source 33 of the first reading apparatus 32, is scattered at the two diffractive relief structures 16, 20 of the diffractive bar code 3 into the half-space over the bar code 3. The first polarization filter 39 arranged in front of the first photodetector 37 is only transmissive in respect of the light 36 backscattered at the first diffractive relief structures 16 while the second photodetector 43, behind the polarization filter 41, receives exclusively the light 36 backscattered by the second diffractive relief structures 20. The light source 44 in the second reading apparatus 42 is not required.

An output 45 of the first photodetector 36 and an output 46 of the second photodetector 43 are connected to an analyzer 47 of the reading arrangement. The analyzer 47 produces the code number for the device 38 which provides for further processing and which is connected to the analyzer 47. In the reading operation simultaneously the signals produced by the photodetectors 36, 43 are processed and the corresponding code numbers transmitted to the processing device 38.

The reading arrangement with two commercially available reading apparatuses 32, 42 is suitable for reading off the above-described diffractive bar code 3 whose fields 4 (FIG. 5) are occupied by the first diffractive relief structure 16, the intermediate surfaces 5 thereof (FIG. 5) being occupied by the second diffractive relief structure 20. Therefore, at any time, at the two outputs 45 and 46, the signals produced by the photodetectors 37, 43 in the operation of reading off that bar code 3 are complementary to each other. That advantageously permits checking of the read bar code 3, from the security point of view.

The bars (21 (FIG. 5) of the further bar code which, as described above, is applied for example to the cover layer 10 by a printing process over the diffractive bar code 3 produced from the first diffractive relief structure 16 and the second diffractive relief structure 20, absorb the light 36 which is incident in the illuminated spot 31 (FIG. 7). The narrow bars 21 are approximately as wide as the diameter of the spot 31 illuminated by the reading beam 34 and the wide bars 21 are at least twice as wide as the narrow bars 21. The narrow bars of the diffractive bar code 3 are of the width B (FIG. 6) of at least three narrow bars so that in the color-free intermediate spaces of the further bar code, at least 30% of the area of the fields 4 and the intermediate surfaces 5 respectively is visible. If the spot 31 covers the bar 21, no backscattered light 36 is produced and no signal from the photodetectors 37, 43 occurs at the two outputs 45, 46. Inputs of a logic unit 48 are connected to the two outputs 45, 46. For the duration of a coincidence of the state "no signal" on the two outputs 45, 46, the logic unit 48 changes its output signal and, on a line 49 between the logic unit 48 and the analyzer 47, produces the reading signal for the further bar code formed from the bars 21. The analyzer 47 produces therefrom the code number corresponding to the individual information of the labels 1 (FIG. 1), which is contained in the further bar code which has been read off. The information of the diffractive bar code 3 which is read out at the same time with the further bar code gives for example information about the issuer of the labels 1. The advantage of that reading arrangement is that it simultaneously reads the further bar code produced by printing and the diffractive bar code 3 and is made up from commercially available reading units 32, 42.

So that, in the operation of machine reading of the bar codes 3, 24, 26, no faults occur due to light diffracted at the emblems 7 (FIG. 8) and digits and letters 8 (FIG. 8) formed from diffractive grating structures arranged mosaic-like, the azimuths of the grating vectors k of those diffractive grating structures differ by at least ±20° from the azimuths of the grating vectors k1, k1 and k2 respectively of the diffraction structures used in the diffractive bar codes 3, 24, 26. If for example the grating vectors k1 and k2 involve the azimuths 0° and 90°, then the azimuths of the grating vectors k are to be selected from the ranges of between 20° and 70°, and 110° and 160°, in each case modulo 180°.

Instead of visible light it is also possible to use the adjacent ranges of the spectrum of visually visible light, in particular the near infrared range.

As can be seen from FIG. 4 unpolarizedly incident light 17 (FIG. 9) is not completely linearly polarized at the first and second diffractive relief structure 16 (FIG. 9) respectively. The backscattered light 36 (FIG. 9) has, for each diffractive relief structure 16, besides the intensive component diffracted in accordance with the efficiency curve TE, also a weaker component diffracted in accordance with the efficiency curve TM. However the intensity of one of the two polarized components of the backscattered light 36 predominates in such a way that for example the one reading apparatus 32 (FIG. 9) receives the more intensive component through the first polarization filter 39 (FIG. 9) while the weaker component reaches the other reading apparatus 42 (FIG. 9) through the second polarization filter 41 (FIG. 9). The reading apparatuses 32, 42 react only to the component of the backscattered light 36 involving the higher intensity.

We claim:

1. A label comprising a layer composite with microscopically fine, optically active structures which are embedded between an embossing layer and a protective layer of the layer composite and which are covered with a reflection layer and which in a band-shaped area form at least one machine-readable diffractive bar code and which are arranged in the form of narrow rectangular fields with a first diffractive relief structure and intermediate surfaces separating the fields, wherein the first diffractive relief structure is formed from an additive superimposition of a first zero-order diffraction structure with a microscopically fine, light scattering relief structure, wherein the first zero-order diffraction structure has a spatial frequency of more than 2,300 lines per millimeter, a geometrical depth in the range of between 50 nm and 350 nm and a first grating vector which establishes a linear polarization capacity of the first zero-order diffraction structure, wherein the microscopically fine, light-scattering relief structure is a structure from the group which is formed from isotropically scattering matt structures, anisotropically scattering matt structures, kinoforms and Fourier holograms, so that the first diffractive relief structure diffracts and backscatters light into the half-space above the first diffractive relief structure, wherein the diffracted and backscattered light is linearly polarized in a plane predetermined by said grating vector, and wherein the microscopically fine, optically active structures differ at least with respect to the polarization capacity from the first diffractive relief structure.

2. A label as set forth in claim 1, wherein a second diffractive bar code formed from field surfaces and intermediate fields is arranged parallel to the first diffractive bar code in the area, the field surfaces of the second bar code have a second diffractive relief structure which is a superimposition of a second zero-order diffraction structure having a second grating vector with the microscopically fine, light-scattering relief structure, wherein the first grating vector of the first zero-order diffraction structure and the second grating vector of the second zero-order diffraction structure include an azimuth angle in the range of between 45° and 135°, and the intermediate surfaces and the intermediate fields have at least one further diffractive relief structure with a further grating vector, wherein the azimuth of the further grating vector differs from the azimuth of the first and second grating vectors.

3. A label as set forth in claim 2, wherein the first and second bar codes are mutually nested, wherein both the fields and the intermediate surfaces of the first bar code have a predetermined division into first surface portions and also the field surfaces and the intermediate fields of the second bar code have the same division into second surface portions, in the area in the sequence predetermined by the two bar codes the first surface portions and the second surface portions are arranged in such a way that each two adjacent first surface portions are separated by a respective one of the second surface portions.

4. A label as set forth in claim 2, wherein the first and second zero-order diffraction structures involve the same parameters except for the direction of the first and second grating vectors.

5. A label as set forth in claim 4, wherein the direction of the first and second grating vectors and the grating vectors are oriented in mutually perpendicular relationship.

6. A label as set forth in claim 1, wherein at least one of the layers of the layer composite has indicia which are printed on with light-absorbing ink.

7. A label as set forth in claim 6, wherein some of the indicia form lines of an optically machine-readable printable bar code, wherein the lines are separated by color-free intermediate spaces disposed therebetween and are oriented in parallel relationship with the fields and the intermediate surfaces of the diffractive bar code.

8. A label as set forth in claim 1, wherein the intermediate surfaces of the first diffractive bar code have at least one further diffractive diffraction structure with a further grating vector, wherein the azimuth of the further grating vector differs from the azimuth of the first grating vector.

9. A label as set forth in claim 8, wherein the further diffractive diffraction structure in the intermediate surfaces is a further diffractive relief structure, the further diffractive relief structure is produced by a superimposition of a microscopically fine, light-scattering relief structure with a further zero-order diffraction structure having a further grating vector, and wherein the further grating vector differs in azimuth from the first grating vector by at least ±20° modulo 180°.

10. A label as set forth in claim 9, wherein the first and the further zero-order diffraction structures involve the same parameters except for the direction of the first and the further grating vectors.

11. A label as set forth in claim 1, wherein the intermediate surfaces of the diffractive bar code are light reflective or absorbing bars.

12. A label as set forth in claim 2, wherein the intermediate surfaces of the diffractive bar code are light reflective or absorbing bars.

13. A label as set forth in claim 2, wherein the intermediate fields of the second diffractive bar code have a second further diffraction structure with a second further grating vector, wherein the azimuth of the second further grating vector differs from the azimuth of the further grating vector in the intermediate surfaces.

14. A label as set forth in claim 13, wherein second further diffraction structure has the same parameter as the second zero-order diffraction structure except for the direction of the further second grating vector.

15. A reading arrangement for optically reading items of information out of an area on a label as set forth in claim 9 comprising:
   a) a first bar code reading apparatus comprising a transparent window, a reading beam issuing through the window for optically scanning a reading region, a first photodetector which is adapted to receive light of the reading beam which is backscattered in the reading region, and an optical first polarization filter arranged in front of the first photodetector for filtering out the backscattered light which is not linearly polarized in predetermined fashion,
   b) a second bar code reading apparatus comprising a transparent window, an inactive light source and a second photodetector, wherein the second bar code reading apparatus is adapted to receive the light backscattered in the reading region of the reading beam of the first bar code reading apparatus, and wherein a second optical polarization filter is arranged in front of the second photodetector and oriented in rotated relationship through a predetermined angle with respect to the first optical polarization filter for filtering out the backscattered light which is not linearly polarized in predetermined fashion, and
   c) a first output of the first photodetector and a second output of the second photodetector, at which appear electrical signals proportional to the intensity of the light backscattered onto the photodetectors, and
   d) a signal analyzer connected to the first output and to the second output for producing a code number for the electrical signals from the photodetectors transmitted from the first output and from the second output to the signal analyzer and the signals produced by the photodetectors in the operation of reading off the read bar code are complementary to each other allowing a security check of the read bar code.

16. A reading arrangement for optically reading items of information out of an area on a label as set forth in claim 10 comprising:
   a) a first bar code reading apparatus comprising a transparent window, a reading beam issuing through the window for optically scanning a reading region, a first photodetector which is adapted to receive light of the reading beam which is backscattered in the reading region, and an optical first polarization filter arranged in front of the first photodetector for filtering out the backscattered light which is not linearly polarized in predetermined fashion,
   b) a second bar code reading apparatus comprising a transparent window, an inactive light source and a second photodetector, wherein the second bar code reading apparatus is adapted to receive the light backscattered in the reading region of the reading beam of the first bar code reading apparatus, and wherein a second optical polarization filter is arranged in front of the second photodetector and oriented in rotated relationship through a predetermined angle with respect to the first optical polarization filter for filtering out the backscattered light which is not linearly polarized in predetermined fashion, and
   c) a first output of the first photodetector and a second output of the second photodetector, at which appear electrical signals proportional to the intensity of the light backscattered onto the photodetectors, and
   d) a signal analyzer connected to the first output and to the second output for producing a code number for the electrical signals from the photodetectors transmitted from the first output and from the second output to the signal analyzer and the signals produced by the photodetectors in the operation of reading off the read bar code are complementary to each other allowing a security check of the read bar code.

17. A label as set forth in claim 9, wherein at least one of the layers of the layer composite has indicia which are printed on with light-absorbing ink and some of the indicia form lines of an optically machine-readable printed bar, wherein the lines are separated by color-free intermediate spaces disposed there between and are oriented in parallel relationship with the fields and the intermediate surfaces of the first diffractive bar code, wherein the printed bar code is arranged over the first diffractive bar code and at least 30% of each field and each intermediate surface of the first diffractive bar code is visible through the color-free intermediate spaces.

18. A reading arrangement for optically reading items of information out of an area on a label as set forth in claim 15 comprising:
   a) a first bar code reading apparatus comprising a transparent window, a reading beam issuing through the window for optically scanning a reading region, a first photodetector which is adapted to receive the light of the reading beam which is backscattered in the reading region; and an optical first polarization filter arranged in front of the first photodetector for filtering out the backscattered light which is not linearly polarized in predetermined fashion,
   b) a second bar code reading apparatus comprising a transparent window, an inactive light source and a second photodetector, wherein the second bar code reading apparatus is adapted to receive the light, backscattered in the reading region, of the reading beam of the first bar code reading apparatus, and a second optical polarization filter arranged in front of the second photodetector and oriented in rotated relationship through a predetermined angle with respect to the first optical polarization filter for filtering out the backscattered light which is not linearly polarized in predetermined fashion, and
   c) a first output of the first photodetector and a second output of the second photodetector having electrical signals proportional to the intensity of the light backscattered onto the photodetectors, and
   d) a signal analyzer connected to the first output and to the second output for producing a code number for the electrical signals from the photodetectors transmitted from the first output and from the second output to the signal analyzer.
   e) a logical element is connected with one of its inputs to the output of the first photodetector and with another one of its inputs to the output of the second photodetector and by means of an output line the output of the logical element is connected to the signal analyzer wherein the logical element produces an output signal for the duration of a coincidence of the state "no signal" on the two outputs of the photodetectors, so that the signal analyzer produces a second reading signal corresponding to the printed bar code.

* * * * *